July 11, 1961 A. F. BECAN 2,992,011
REFUSE CART
Filed March 6, 1959 3 Sheets-Sheet 1
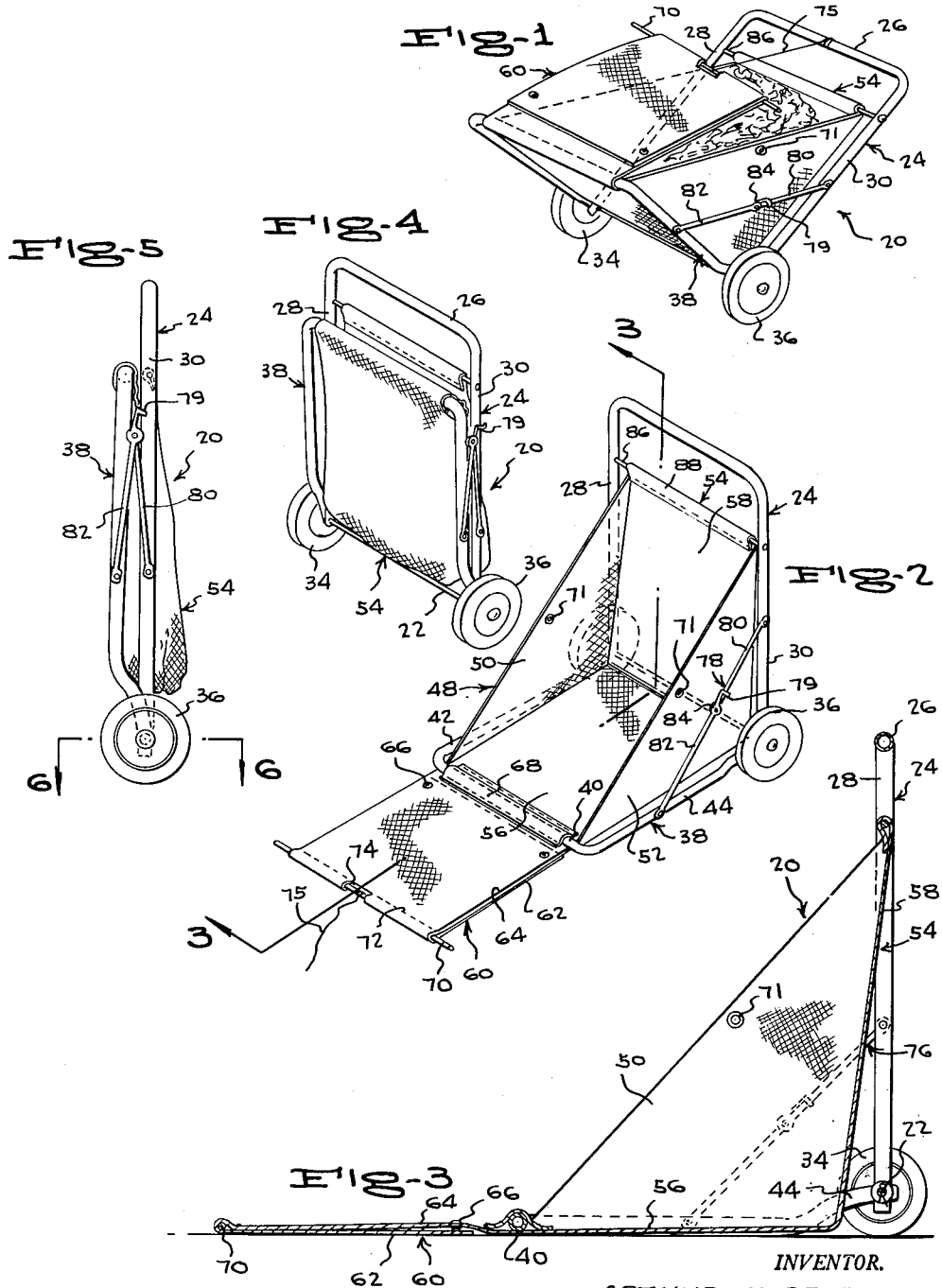
INVENTOR.
ARTHUR F. BECAN
BY
McMorrow, Berman & Davidson
ATTORNEYS

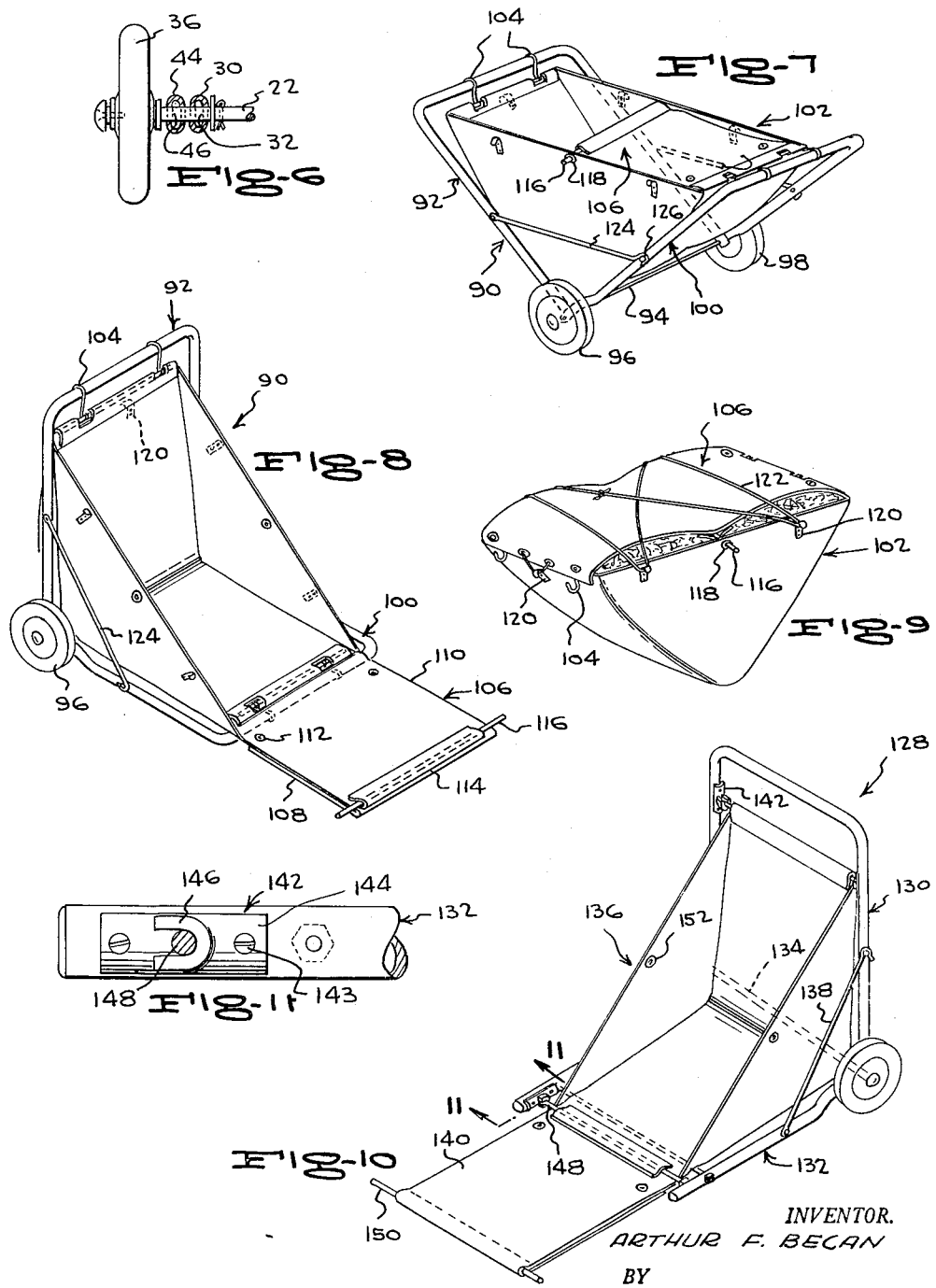

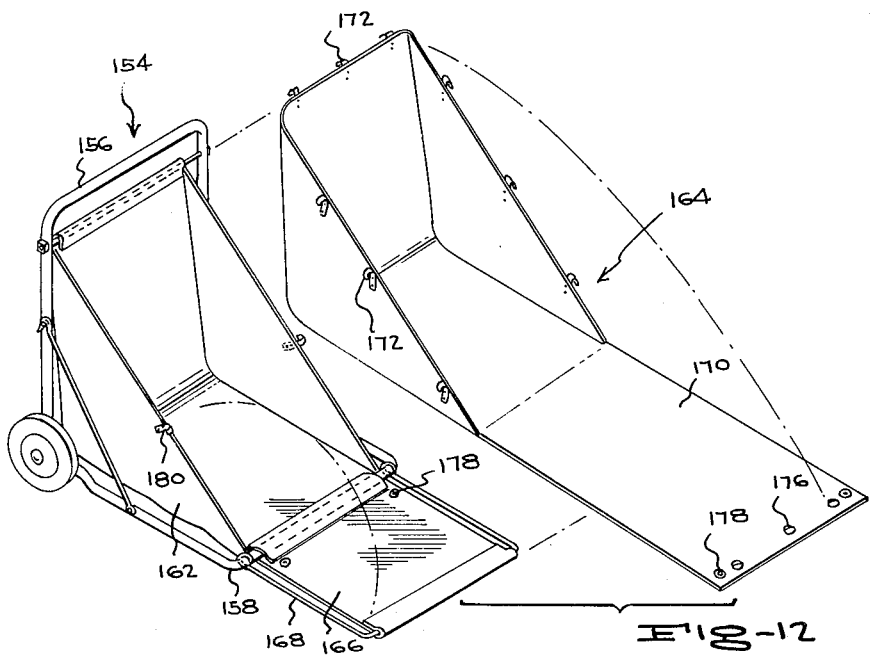
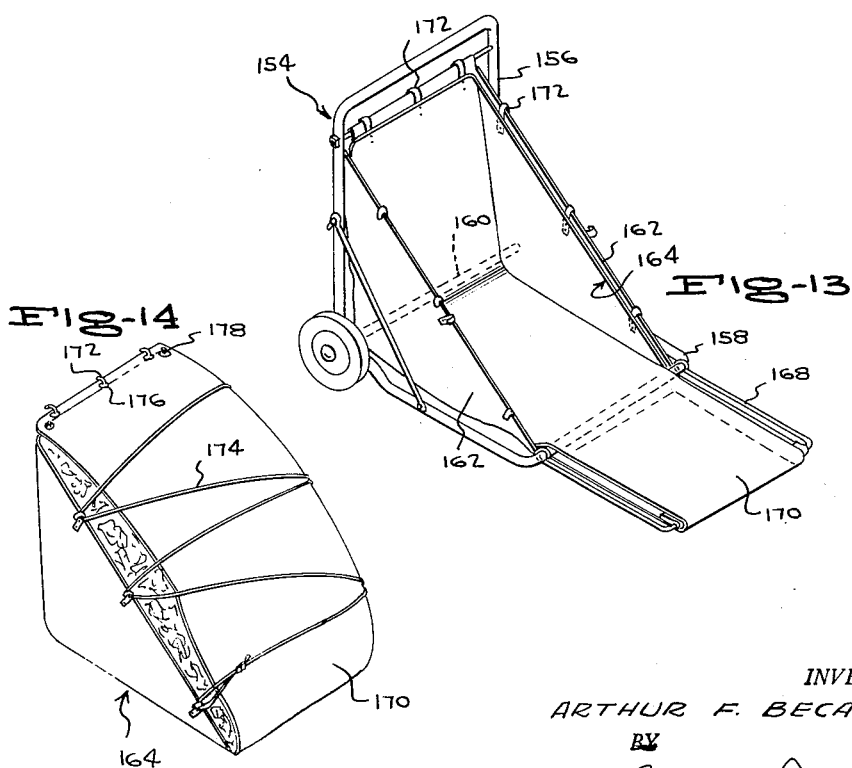

United States Patent Office 2,992,011
Patented July 11, 1961

2,992,011
REFUSE CART
Arthur F. Becan, 36 Jean Road, West Islip, N.Y.
Filed Mar. 6, 1959, Ser. No. 797,725
6 Claims. (Cl. 280—36)

The present invention relates to a refuse cart of the collapsible type.

In the past, many forms of a collapsible cart for receiving and transporting garden and lawn refuse have been proposed. The refuse is generally of large bulk and relatively light weight, and usually consisting in leaves, grass cuttings, wilted or dead flowers and plants, or the like. The gathering of such refuse and transportation of the same to a place of disposal is a tedious and frequently disagreeable task for the professional or amateur gardener. Often, such tasks must be performed during periods of windy weather and the refuse, such as fallen leaves or the like, is blown by the wind from the cart or wheelbarrow as fast as the refuse is gathered, raked into piles, and the piles or portions of the piles lifted manually into the wheelbarrow or cart.

An object of the present invention is to provide a collapsible refuse cart which lends itself to the raking and gathering of garden refuse such as leaves, grass cuttings, or the like, with ease and facility. In this respect the cart has been provided with a loading apron which may be extended upon the ground to assist the transfer of leaves into the cart. A further use for the apron is to secure the gathered refuse within the cart when piled therein to keep the refuse from being blown out of the cart by the wind and to prevent inadvertent spillage therefrom.

Another object of the present invention is to provide a collapsible refuse cart having relatively large carrying capacity but one which is of compact size when collapsed for storage.

A further object of the present invention is to provide a collapsible refuse cart having a removable liner for the temporary storage of refuse out of the cart.

A still further object of the present invention is to provide a refuse cart of the collapsible type which is sturdy in construction, one simple in structure, one economical to manufacture and assemble, and one which is highly effective in action.

Yet another object of the present invention is to provide a collapsible cart having a body or container easily removed from the cart for storage of refuse out of the cart, also permitting bodily lifting of the container so as to empty the same on a pile of refuse or in the open top of a bin at a level above the cart.

A further object of the present invention is to provide a collapsible refuse cart which lends itself to emptying with ease and facility by inversion of its basket body.

These and other objects and advantages of the present invention will be fully apparent from the following description when taken in conjunction with the annexed drawings, in which:

FIGURE 1 is an isometric view of the cart of the present invention, shown in loaded condition with the refuse holding means shown in operative position;

FIGURE 2 is an isometric view of the assembly shown in FIGURE 1, shown in an empty condition and in position for loading;

FIGURE 3 is a view, on an enlarged scale, taken on the line 3—3 of FIGURE 2;

FIGURE 4 is an isometric view of the assembly shown in FIGURE 2, in folded or nested condition;

FIGURE 5 is a side elevational view of the assembly shown in FIGURE 4, on an enlarged scale;

FIGURE 6 is a detail view, partially in section, and on an enlarged scale, taken on the line 6—6 of FIGURE 5;

FIGURE 7 is an isometric view of a modified form of the cart shown in a closed condition and in a position for moving over a ground surface;

FIGURE 8 is an isometric view of the assembly shown in FIGURE 7, shown in a position of use ready to receive a load;

FIGURE 9 is an isometric view of the basket body of the assembly shown in FIGURES 7 and 8, shown removed from the cart frame;

FIGURE 10 is an isometric view of still another form of the cart of the present invention, shown in a position ready for loading;

FIGURE 11 is a view on an enlarged scale, taken on the line 11—11 of FIGURE 10;

FIGURE 12 is an isometric exploded view of a still further form of the present invention, showing a removable liner for the cart removed from the cart;

FIGURE 13 is an isometric view of the assembly shown in FIGURE 12, shown in a position ready for loading; and FIGURE 14 is an isometric view of the loaded liner tied and ready for transportation to a place of storage or disposal.

Referring in greater detail to the drawings in which like numerals indicate like parts throughout the several views, in FIGURES 1 to 5, the reference numeral 20 designates generally the cart of the present invention and comprising a wheel-supported axle 22 with a first frame 24 arranged in an upright direction. The lower end of the first frame 24 is pivotally connected to the axle 22.

The frame 24 is of inverted U-shaped configuration with the bight 26 thereof forming a handle for the cart 20, and with the legs 28 and 30 of the frame 24 extending from the axle 22 to the bight 26.

In FIGURE 6, the lower end portion of the one leg 30 is shown provided with a hole, as indicated in dotted lines at 32, receiving the adjacent portion of the axle 22. Wheels 34 and 36 are pivotally mounted to the axle 22 at the ends thereof.

A second frame 38 is positioned perpendicularly with respect to the first frame 24 and has the one end adjacent to the axle 22 pivotally connected to the axle 22.

The frame 38 is also of inverted U-shaped configuration with a bight 40, and legs 42 and 44 extending from the bight 40 to the axle 22. As shown in FIGURE 6, the lower end portion of the leg 44 is provided with a hole, shown in dotted lines and designated by the numeral 46, receiving the adjacent part of the axle 22. The other legs 28 and 42 are similarly provided with holes receiving the other parts of the axle 22.

The cart of the present invention has a basket body 48, open at the top, extending over and attached to the frames 24 and 38. The body 48 is fabricated of flexible material such as canvas or the like and includes triangular shaped side panels 50 and 52 and an elongated rectangularly shaped panel 54 subdivided into front and back sections 56 and 58, respectively.

An apron 60 is positioned outwardly of the end of the frame 38 remote from the axle 22 and is in linear alignment with the frame 38. The apron 60 is connected to the free end of the frame 38 for swinging movement of the apron 60 from the linear alignment position (FIGURE 2) to a position extending over and resting upon the open top of the basket body 48, as shown in FIGURE 1. The apron 60 consists in a pair of sections 62 and 64 with one end of the section 64 formed integrally with the adjacent end of the section 56. In other words, the apron sections 62 and 64 are extensions of sections 56 and 58 and are a part of the rectangular panel 54.

Referring to FIGURE 2, the sections 62 and 64 are arranged with the section 62 lower than the section 64 and with the section 62 adapted for resting upon the ground surface and the lower section 62 folded back below section 64 and detachably connected to the section 64 by cooperating snap fasteners 66. The snap fasteners 66 have conventional construction and are not further described for reasons of simplicity.

The means connecting the adjacent end of the apron section 64 to the bight 40 of the frame 38 consists in a fabric strip 68 overlying the bight 40 and secured by stitching to the adjacent end of the section 64 of the apron 60 and the adjacent end of the section 56 of the panel 54. The strip 68 with the adjacent part of the panel 54 forms a sleeve slidably receiving the bight 40.

A bar 70 is inserted between the connecting ends of the sections 62 and 64 of the apron 60 and stitching 72 (FIGURE 2) through the adjacent parts of the apron sections 62 and 64 forms a sleeve for the bar 70. The sections 62 and 64 are cut away to form an opening 74, exposing the midportion of the bar 70 and enabling a user of the cart 20 to grasp the bar 70 for manipulation of the apron 60 to shift refuse piled on the apron 60 into the body 48. A cord 75, secured by one end to the exposed portion of the rod 70, may be employed, as in FIGURE 1, to tie the partially unfolded apron 60 to the bight 26 if the size of the load in the body 48 prohibits it being compressed sufficiently to permit insertion of the ends of the rod 70 in the holes 71 provided in the body side panels 50, 52.

Means is provided connecting the frame 24 and frame 38 together for movement of the frames 24 and 38 from the position outwardly of each other as in FIGURES 1 and 2 to a position in which the frames 24 and 38 are parallel to each other. This means consists in a pair of brace members 76 and 78 positioned exteriorly of the side panels 50 and 52. The brace members 76 and 78 are identical and will be described with reference to the members 78. Each of the brace members 76 and 78 is formed of a pair of sections 80 and 82 arranged in confronting end to end relation and hingedly connected at their confronting ends by a hinge pin 84. Each member 76, 78 has a lock element 79 for holding the member in the end to end relation position. The nonconfronting ends of each of the sections 80 and 82 are pivotally connected to the adjacent frames 24 and 38, respectively. The end of the panel section 58 remote from the section 56 is bent over on itself and provided with stitching 88 to form a sleeve for a securing bar 86 which has its ends inserted in holes in the frame legs 28 and 30.

Referring to FIGURES 7 to 9, inclusive, the reference numeral 90 designates a modified form of the cart of the present invention and including a frame 92 identical in most respects to the frame 24 and having the free ends of its legs mounted upon an axle 94, the axle 94 being supported on wheels 96 and 98. Another frame 100 is positioned relative to the frame 92 as was the frame 38 positioned relative to the frame 24. The lower end of the frame 100 is mounted upon the axle 94 for movement from the extended position substantially perpendicular with respect to the frame 92 to a collapsed position parallel to the frame 92, the collapsed position not being illustrated but being similar to that shown in FIGURES 4 and 5 with reference to the cart 20.

The cart 90 supports a basket body 102 with a pair of hooks 104 on each end of the body 102 engaging the horizontal parts of the frames 92 and 100.

The cart 90 is provided with an apron 106 positioned outwardly of the end of the frame 100 remote from the axle 94 and in linear alignment with the frame 100. The apron 106 is adapted to rest upon a ground surface as in FIGURE 8 when in the linear aligned position and is adapted to extend over and rest upon the open top of the basket body 102, partially closing the same, as in FIGURE 7.

The apron 106 is formed of two sections, a lower section 108 and an upper section 110 having their one ends detachably secured together by a snap fastener assembly 112 adjacent each side edge thereof. A strip 114 is stitched to the apron 106 to form a sleeve for a bar 116 which, when the apron 106 is in position over the open top of the basket body 102, has its end portions received in apertures 118 provided in the side walls of the basket body 102, as in FIGURE 7.

The side and end walls of the basket body 102 are provided with hooks 120 for receiving a length of cord 122 for binding the apron 106 over the open top of the basket body 102.

The means for holding the frames 92 and 100 in the extended open position for receiving the basket body 102 consists in a pair of hook elements 124 positioned on each side of the basket body 102 and each having one end pivotally connected to the frame 92 and having the other end engageable with a pin 126 projecting outwardly from the side of the other frame 100 intermediate the ends of the legs of that frame.

Referring to FIGURE 10, a further modified form of the invention is shown in which the numeral 128 represents a cart having a first frame 130, a second frame 132, each connected by one end to a wheel-supported axle 134, the latter being shown only in dotted lines.

A basket body 136 is insertable into and withdrawable from the side frames 130 and 132 when the latter are in the extended position, as shown in FIGURE 10. The basket body 136 is similar in most respects to the basket body 102 and hook elements 138 maintain the frames 130 and 132 in their positions separated from each other and provide rigidity to the cart 128. An apron 140 projects from one end of the basket body 136 and is connected for swinging movement from the aligned position to a position partially over the open top of the basket body 136, the latter position not being shown but being similar to the position of the apron 106 with reference to the cart 90, as illustrated in FIGURE 7.

The means releasably securing the basket body 136 to the cart frames 130 and 132 include socket members 142 secured on the inner parts of the frames 130 and 132 at points remote from the axle 134. One such socket member 142 is shown in FIGURE 11 and is seen to consist in a plate having an arcuate face conformably shaped and secured by screws 143 to the adjacent part of the leg of the frame 130, 132, the plate being designated by the numeral 144. From the convex face of the plate 144 projects a U-shaped keeper 146 receiving the adjacent end portion of a rod 148 which extends through a sleeve provided in the fabric of the ends of the basket body 136 and secures the basket body 136 in extended condition when the frames 130 and 132 are in the position substantially perpendicular with respect to each other.

A bar 150 extends through another sleeve provided in the apron 140 and has its end portions receivable through apertures 152 provided in the side walls of the basket body 136 intermediate the ends of the latter.

Referring to FIGURES 12 to 14, inclusive, a still further modified form of the invention is illustrated in which the numeral 154 represents a cart having frames 156 and 158 connected at their one ends to a wheel-supported axle, seen only in dotted lines in FIGURE 13. A basket body 162 is supported within the cart 154 and is foldable to a collapsed position when the frames 156 and 158 are moved from their extended position to positions parallel with respect to each other, such positions parallel to each other not being illustrated but being similar to that shown in FIGURES 4 and 5 with respect to the cart 20.

A liner 164 is conformably shaped to extend over the body 162 and over an apron 166 which projects from one end of the body 162 and is in linear alignment with the frame 158.

The apron 166 is fabricated of a single thickness having a sleeve formed at one end receiving the bight of a U-shaped support member 168 having the free ends of its legs pivotally connected to the adjacent end portion of the frame 158, as shown most clearly in FIGURE 12.

The liner 164 is provided with an apron portion 170 which is folded over the apron 166 when the liner 164 is positioned within the body 162 and the support member 168 is positioned so that the apron 166 lies over a ground surface.

The two sides and one end of the liner 164 are provided with hooks 172 receiving a cord 174 when the apron portion 170 is pulled back over the open top of the liner 164 and after refuse has been swept into the liner 164. This is shown in FIGURE 14, which also shows that holes provided in the free end portion of the apron portion 170, as at 176, may have inserted therein the adjacent hooks 172 on the end of the liner 164.

Cooperating snap fasteners 178 are provided on the free end edge of the apron portion 170 of the liner 164 and upon the portion of the apron 166 adjacent the bight of the frame 158, as shown in FIGURE 12. The fasteners 178 secure the folded under part of the apron portion 170 when the liner 164 is within the body 162 and the apron portion 170 is folded over the apron 166, as shown in FIGURE 13.

The hooks 172 on the edges of the liner 164 support the liner 164 when it is within the body 162 and other hooks 180 on the sides of the body 162 engage portions of the legs of the support member 168 when the apron 166 is folded over the adjacent end portion of the open top of the body 162, this latter position not being shown but being similar to the position of the apron 106 with respect to the basket body 102 of the cart 90 in FIGURE 7.

In use, with either of the modified forms of the cart 20, 90, 128, or 154, the frame of such carts may be shifted outwardly from each other to open the respective basket body for the reception therein of gathered leaves, grass cuttings, or other refuse. With the respective aprons of the carts 20, 90, 128, and 154 in the horizontal position and resting upon the ground surface, the refuse may be raked or swept into the basket body and on to such apron and the apron lifted bodily to shift the refuse into the body of the cart at the same time compressing a full load. The aprons of the carts, when in the position extending over part of the open top of the basket bodies, prevent inadvertent loss therefrom of the stored refuse.

When the basket body 48, 102, 136, or the liner 164 of the body 162 becomes filled with refuse, the respective apron 60, 106, 140, or 166 may be swung to the position overlying a part of the open top of the body for partially closing and securing the open top of the body. When the liner 164 is employed with the body 162, the apron portion 170 may be unsnapped from the closed and secured apron 166 and unfolded to fully cover the open top of the body 162, and after the cover has been secured by means of hooks 172 inserted in adjacent holes 176 and its sides tied with cord 174, the liner may be removed from the body 162. In the case of the basket body 102 or 136 of the carts 90 or 128, respectively, after the respective apron 106 or 140 has been swung closed and secured as a partial cover, the lower section 108 of the apron may be unsnapped and unfolded to fully cover the open top of the basket, and after the cover is secured, the respective basket may be removed from its supporting frames.

It will be seen therefore that the cart of the present invention in each of its forms provides a means for handling garden refuse with ease and facility and a means for transporting the gathered refuse in a compact bundle or package to a place of disposal or storage after gathering.

What is claimed is:

1. In a two-wheeled cart having a V-shaped collapsible frame supporting a flexible fabric receptacle body having a generally rectangular top-loading opening, said V-shaped frame being pivotable about the wheels from an upright position to a position wherein one edge of said opening may rest adjacent the ground, the improvement comprising a generally U-shaped frame including side legs and an outer cross-member interconnecting said legs, the inner ends of said legs being pivotally mounted to said V-shaped frame near said one edge of said opening, and an apron of flexible material secured across its width to said cross-member and to said V-shaped frame across the width of said one edge of said opening, leaving side portions of said apron unsecured adjacent the legs of said U-shaped frame.

2. A cart according to claim 1 wherein a flexible liner is fitted inside said receptacle body and over said apron, and means are provided for fastening said liner to said body and apron, the apron and portions of the liner overlying said apron being adapted to extend over the top of said loading opening.

3. In a two-wheeled cart having a V-shaped flexible fabric body and a rigid supporting frame therefor, said body defining a generally rectangular top-loading opening therein and one edge of said opening being adapted to assume a position adjacent the ground, the improvement comprising a generally U-shaped frame having side legs and an outer cross-member interconnecting said legs, the inner ends of said legs being pivotally mounted to said body supporting frame near said one edge of said opening, and an apron of flexible material secured across its width to said cross-member and to said fabric body across the width of said one edge of said opening, leaving side portions of said apron unsecured adjacent the legs of said U-shaped frame.

4. A two-wheel refuse cart comprising a pair of wheels spaced in axial alignment, a frame pivoted for swinging movement about the axis of said wheels and having a portion extending forwardly of said wheels, said forwardly-extending portion of the frame, when the frame is swung forwardly and downwardly, being adapted to rest on the ground, a refuse-receiving body carried by said frame and having an opening through which it may be loaded, a flexible apron extendable forwardly from the forward side of said opening to lie substantially flat on the ground when the frame is swung to cause the forward portion thereof to rest on the ground, the apron, when the frame is in such position, being adapted to have refuse piled thereon, and, when loaded with refuse, being adapted to be swung upwardly and towards said body to discharge refuse thereon through said opening and into said body, said apron having a continuous attachment across its width to the forward side of said opening to prevent passage of refuse between the rear side of the apron and the forward side of said opening.

5. A two-wheel refuse cart according to claim 4 in which said body is flexible and the rear side of said apron is connected throughout its width to and forms a continuation of said body.

6. A two-wheel refuse cart comprising a pair of wheels spaced in axial alignment, a frame pivoted for swinging movement about the axis of said wheels and having a portion extending forwardly of said wheels, said forwardly-extending portion of the frame, when the frame is swung forwardly and downwardly, being adapted to rest on the ground, a refuse-receiving body carried by said frame and having an opening through which it may be loaded, a flexible apron extendable forwardly from the forward side of said opening to lie substantially flat on the ground when the frame is swung to cause the forward portion thereof to rest on the ground, the apron, when the frame is in such position, being adapted to have refuse piled thereon, and, when loaded with refuse, being adapted to be swung upwardly and towards said body to discharge refuse thereon through said opening and into said body, and means maintaining a rear portion of said apron closely adjacent the forward side of said opening throughout substantially the entire width of the apron to prevent passage of refuse between the rear side of the apron and the forward side of said opening.

References Cited in the file of this patent

UNITED STATES PATENTS

| | | |
|---|---|---|
| 1,233,832 | Barbour | July 17, 1917 |
| 1,396,420 | Glinchikoff | Nov. 8, 1921 |
| 2,019,451 | Harm | Oct. 29, 1935 |
| 2,431,834 | Sinclair | Dec. 2, 1947 |
| 2,789,829 | Parker | Apr. 23, 1957 |
| 2,896,960 | Whiting | July 28, 1959 |

FOREIGN PATENTS

| | | |
|---|---|---|
| 20,705 | France | Nov. 30, 1918 |
| | (1st addition to 481,536) | |
| 481,536 | France | Sept. 22, 1916 |
| 382,776 | Germany | Oct. 6, 1923 |